United States Patent

Sakamoto et al.

[11] Patent Number: 5,545,117
[45] Date of Patent: Aug. 13, 1996

[54] FUSE BONDING AND FUSE CUTTING MACHINE FOR A PLASTIC BALLOON AND THE LIKE

[76] Inventors: Atsunobu Sakamoto, 3-10-15 Minamiyama, Shiroimachi,Inbagun Chiba-ken, 270-14; Chieko Sekiguchi, Laionzumanshon Matsudo-Nijusseikigaoka 404 20-1, Hagimachi Nijusseikigaoka Matsudo-shi, Chiba-ken, 271, both of Japan

[21] Appl. No.: 256,781

[22] PCT Filed: Nov. 24, 1993

[86] PCT No.: PCT/JP93/01721

§ 371 Date: Sep. 8, 1994

§ 102(e) Date: Sep. 8, 1994

[87] PCT Pub. No.: WO94/12337

PCT Pub. Date: Jun. 9, 1994

[30] Foreign Application Priority Data

Nov. 26, 1992 [JP] Japan .................................. 4-353815

[51] Int. Cl.$^6$ .................................................... B31B 19/60
[52] U.S. Cl. ............................................ 493/203; 219/548
[58] Field of Search ............................ 219/529, 548, 219/549, 243; 156/251, 308.4; 493/189, 190, 203, 204, 209, 210

[56] References Cited

U.S. PATENT DOCUMENTS

| 3,149,017 | 9/1964 | Ehrreich | 493/190 |
| 3,198,685 | 8/1965 | Kopito | 156/251 |
| 3,912,575 | 10/1975 | Zelnick | 493/203 |
| 4,137,114 | 1/1979 | Ours | 493/203 |

FOREIGN PATENT DOCUMENTS

| 62-50920 | 3/1987 | Japan . |
| 2-205531 | 8/1990 | Japan . |

*Primary Examiner*—Jack W. Lavinder
*Attorney, Agent, or Firm*—Kanesaka & Takeuchi

[57] ABSTRACT

The present invention relates to a method for fuse-bonding or fuse-bonding and fuse-cutting a plastic sheet by an electric heat wire. It is possible to use for manufacturing a shopping bag and an inflatable toy of polyethylene, but especially, a mold for manufacturing a balloon made of aluminum vapour deposition nylon and projections therefor, such as legs, can be simply manufactured. A nichrome circular wire 7 with a size according to a thickness of a sheet 5 to be worked is bent along a shape line of an object, such as balloon or the like, and covered with fluorine resin coated glass cloths 8 with an adhesive agent, which is used as a mold heater 4. The sheet 5 to be worked, silicone rubber 6 and the like are laminated on the mold heater 4, pressed by a press mechanism 1, and heated momentarily by applying electric current from a power source, and then cooled.

8 Claims, 2 Drawing Sheets

FUSE BONDING AND FUSE CUTTING MACHINE FOR A PLASTIC BALLOON AND THE LIKE

TECHNICAL FIELD

The present invention relates to a method for fuse bonding, or fuse bonding and fuse cutting, plastic sheets by means of a heating wire, and this method can be used for manufacturing shopping bags, inflatable toys and the like made of polyethylene, wherein balloons and projections or the like, such as legs, for the balloons made of aluminum vapor deposition nylon as well as molds thereof can be made easily.

BACKGROUND

Conventionally, since nylon balloons and inflatable toys of polyethylene or the like can not be subjected to a high frequency working, these materials have been made such that a heating plate with an overall shape is prepared by a copper or aluminum plate, and pressed onto laminated plastic sheets by means of a press mechanism, while always heating the plate, to fuse bond the laminated plastic sheets, and the fuse bonded plastic sheets are cut, except for thin sheets, by a separately prepared cutter with the overall shape.

However, a material for the inflatable toy of polyethylene or the like is very thin, such as 0.1 to 0.3 mm, if two sheets are laminated. Moreover, if an edge of the cutter is not equally applied to the sheets, inferior portions are formed. Therefore, a mold has been prepared by casting a material which is hardly distorted by heat, scraping and grinding. Especially, in the balloons made of aluminum vapour deposition nylon or the like, the sheet has a very thin thickness, such as one half of that of an ordinary sheet, and requires a high fuse bonding temperature, so that the press mechanism as well as the mold is required to be precise, and the cutter is also very expensive.

Also, as a simple method, the inflatable toys of polyethylene or the like have been prepared by a ball sealing method, wherein fuse bonding and fuse cutting are carried out by using a heater prepared by cutting a nichrome plate along an object configuration in a belt shape with a narrow width, and welding and fixing a thin nichrome wire on the nichrome plate.

However, in the ball sealing method, the nichrome belt has to be formed by cutting along the object configuration from the large plate with the same width from the beginning to the end, so that it is difficult to form. Moreover, since the wire material and the belt material are not always the same quality, these materials move due to expansion discrepancies, resulting in a short life of a product. Further, since the aluminum vapour deposition nylon or the like can not be fuse-cut by this method, this method is not suitable for manufacturing the balloons.

As a further simple method, it has been widely practiced that a plastic sheet is fuse-cut by a straight thin nichrome wire, but since the fuse cut portion can not be strongly fuse-bonded, this method can not be used for fuse-bonding.

Further, for nylon balloons and inflatable polyethylene toys, it is impossible that projections, such as hands and legs, are added to a body by a post-working as for a vinyl working. Therefore, a plastic sheet gusset folded in a W-shape is prepared, a separating agent is applied to the inside of the W-shaped gusset, and the plastic sheet is pressed by a heat mold from the outside thereof to make a nylon balloon and a polyethylene toy. However, in this method, since the body is made of two sheets and the projections are made of four sheets, resulting in different thicknesses, a boundary line between the body and the projections is sealed weakly, and the control of the working temperature of the mold is difficult. Especially, when a temperature is raised such that the four sheets of nylon balloon can be fuse-cut, the nylon material at the sealing boundary line which is once fused and solidified again is liable to break, and therefore products can not be made by this method.

DISCLOSURE OF THE INVENTION

As a plane shape mold heater, a device prepared by bending a resistance wire of a circular shape in a cross section, i.e., an ordinary nichrome wire, along a shape line of a contour of an objective balloon or the like, and wrapping the bent wire with a fluorine resin coated glass cloth provided with an adhesive agent for fixing, is used. A plastic sheet to be worked and an elastic plane member, such as silicone rubber, are laminated onto the heater and pushed by a press mechanism. Electric current is applied thereto from a power source to momentarily heat, and then it is cooled, so that fuse cutting as well as strong fuse bonding can be made.

Besides, the circular wire is required to have a size according to a thickness of the sheet to be worked, and the sheet to be worked is sandwiched between the mold heater and the elastic plane member, and pushed. In order to sufficiently push a wide area, it is required that elastic plane members are provided on both sides of the mold heater, or the elastic plane member is cut along the shape line with a narrow width, so that the shape line can be strongly pressed against the sheet to be worked.

Also, more than two shape lines can be provided to one mold heater, or the mold heater can be separated from the pushing plates.

MOST PREFERRED EMBODIMENTS FOR CARRYING OUT THE INVENTION

Figure 1:
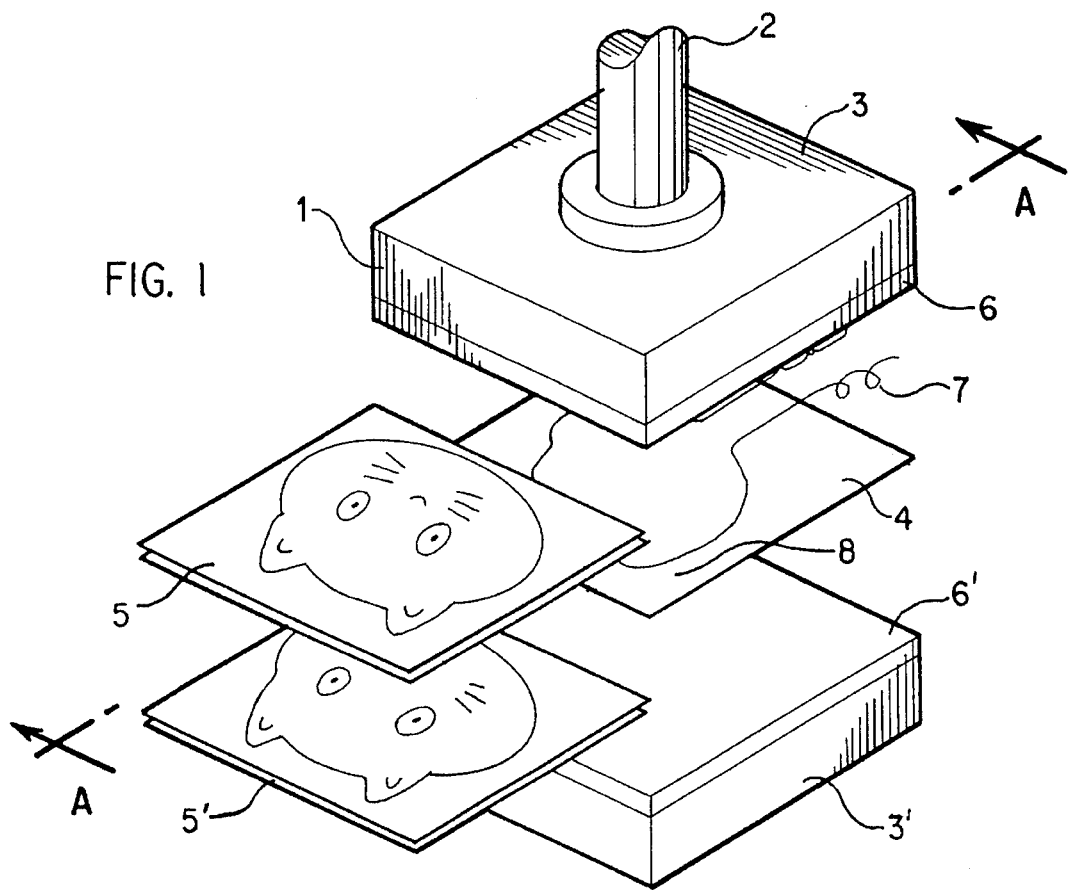
FIG. 1 is a simple perspective view of an embodiment of the present invention.
Figure 2:
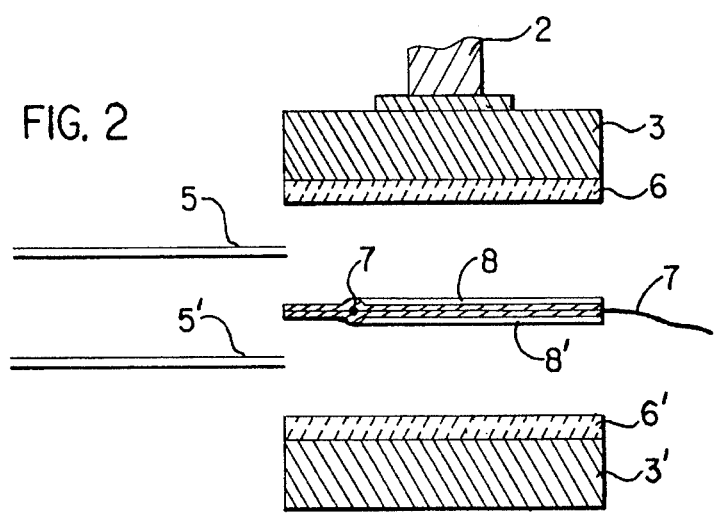
FIG. 2 is a cross section view taken along a line A—A of FIG. 1.

FIG. 1 is a simple perspective view of a fuse bonding and cutting machine 1 of the present invention for simultaneously manufacturing two pieces of balloons with a cat face, and FIG. 2 is a section view taken along a line A—A of FIG. 1. A unit 1 is formed of pushing plates 3, 3' joined to a pressing mechanism 2 partly shown, and a plane mold heater 4 disposed at a middle portion between the pushing plates 3 and 3'. Two pairs of aluminum vapour deposition nylon sheets 5, 5' wherein each pair of the aluminum vapour deposition nylon sheets is printed with cat faces and a polyethylene resin is laminated inside thereof, are going to be inserted into spaces formed on and below the mold heater 4, respectively.

Silicone rubbers 6, 6' with a thickness of about 5 mm are attached to the pushing plates 3, 3', respectively. Also, the mold heater 4 is a device by sandwiching a nichrome wire 7 bent along a contour of the cat face between fluorine resin coated glass cloths 8, 8' with an adhesive agent to be fixed together. And the mold heater 4 is connected to a power source, though it is omitted in the drawings.

When the aluminum vapour deposition nylon sheets 5, 5' are sandwiched and pressed, and electric current is applied thereto to heat the nichrome wire 7, in the two pairs of the closely attached aluminum vapour deposition nylon sheets 5, 5', the respectively laminated sheets are fuse-bonded with each other and also fuse-cut. And, unnecessary portions are pulled and separated, and an air blowing mouth is inserted into an unsealed portion to thereby obtain durable balloons.

Figure 3:
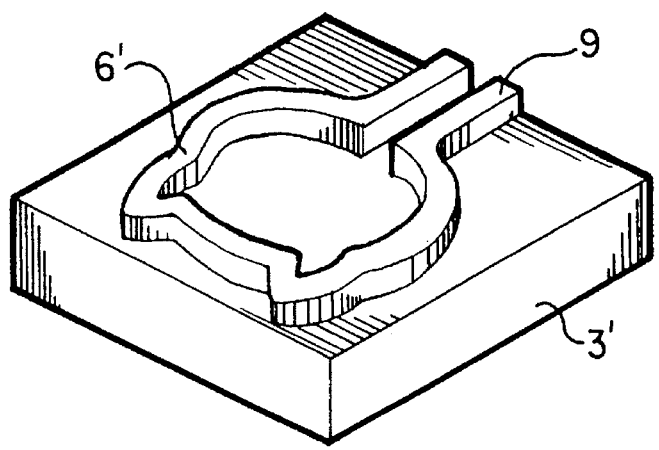
FIG. 3 is a perspective view of a modified embodiment for a part of FIG. 1.

If the silicone rubbers are removed from both pushing plates of this unit to have only the hard metal plates, though the fuse bonding and fuse cutting can be carried out, and on the contrary, the fuse cutting can be easily carried out in this case, sealing strength thereof is very weak and also varies, resulting in unreliable products. Further, when only one silicone rubber 6' for example, is used, it is possible to carry out the fuse bonding and fuse cutting for a smaller area, but a good result can not be obtained for this size. Therefore, as shown in FIG. 3, when the silicone rubber 6' on the pushing plate 3' is cut along the shape line of the cat face with a narrow width 9 so that the mold heater 4 is strongly pressed thereto, the pair of aluminum vapour deposition nylon sheets 5' sandwiched between the mold heater 4 and the silicone rubber 6' is well fuse-bonded and fuse-cut, while the pair of aluminum vapour deposition nylon sheets 5 sandwiched between the mold heater 4 and the pushing plate 3 of the metal plate without the silicone rubber is not well fuse-bonded and fuse-cut.

Based on the above results and in view of the section view of the mold heater, it is essential that a sheet is closely attached to a semicircle portion of the heating wire which is, so to speak, a cutting tool, and for that reason it is essential to use an elastic plane member. And, in view of the plane degrees of the ordinary press mechanism, pushing plates and silicone rubbers and the like used in this experiment, though it depends on a size of the mold heater, in case the elastic plane members are provided on both sides of the mold heater and one of the plane members is cut along a shape line with a narrow width, the most excellent close attachment of the sheets is made. Thus, it is possible to provide the most reliable fuse-bonding in the fuse-cutting line for a completed balloon and the like.

Since the elastic plane member is required, for its function, to have heat resistance and non-adhesiveness in addition to elasticity, silicone rubber or silicone rubber laminated with a fluorine resin sheet is most suitably used therefor. However, the other rubber may be used.

Also, since a nichrome wire has a circular shape in its section and functions as a cutting tool, that is, one fourth of the circle constitutes a cutting edge, even if the wire material is twisted while bending, if inclination thereof is close to or the same as that of the cutting edge, the same effect can be obtained. Therefore, if it is a polygon close to a circle, the same effect can be obtained. Since a wire material of a polygonal shape is not produced generally, in the present invention, the wire material is circular in cross section, but it includes a polygonal shape in cross section.

A diameter of the nichrome wire is required to be skillfully selected according to a thickness of a sheet to be worked. In the experiments, good results are obtained in a nichrome wire of 0.5 phi for two aluminum vapour deposition nylon sheets with a thickness of about 0.05 mm, a nichrome wire of 0.6 phi for polyethylene sheets with a thickness of about 0.1 mm, and about 0.8 phi for 0.15 mm. Although the thicknesses of glass cloths as a cover and presence or non-presence of a gusset folding must be taken into consideration, as the diameter of the nichrome wire is smaller than the above mentioned values, even if pressure of the press is increased, the fuse bonding can be carried out but the fuse cutting can not be performed. On the contrary, as the diameter of the nichrome wire is larger than the above mentioned values, a great amount of electric power is required, which requires extra cooling time. However, the contact for the fuse bonding and fuse cutting is improved to have a room for processing. Thus, a nichrome wire with a little larger diameter than the above values may be used.

For the heater, in addition to the nichrome wire, any resistance wire generating heat when electric current is applied can be used. In order to keep the shape line formed by bending, in addition to the example mentioned before, the shape line can be fixed by being sandwiched with thin and soft heat resisting insulation sheets, such as silica fibers and ceramic fibers, and bonded with a heat resisting adhesive agent or bonding agent. Or one side of the shape line may be fixed to the elastic plane member on the pushing plate. However, since molten polyethylene or the like may be adhered to the elastic plane member, the surface of the elastic plane member is required to be coated with a fluorine resin, so that a fluorine resin coated glass cloth, which is provided with an adhesive agent and easily available on the market, may be used alone.

Figure 4:
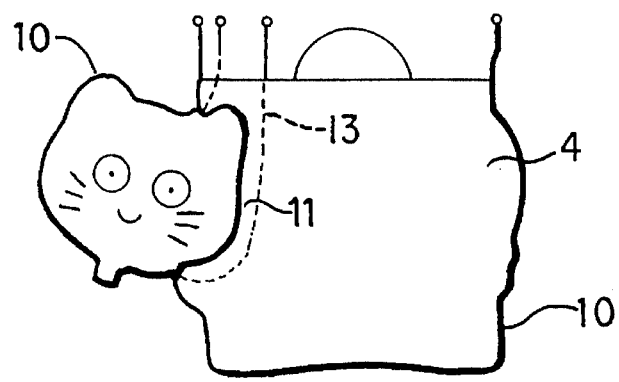
FIG. 4 is a plan view of another modified embodiment of the present invention.

The mold heater 4 of the present invention can also include a plurality of shape lines, such as a fuse bonding and fuse cutting line 10 on the outer side and a fuse bonding line 11 on the inner side of an inflatable cat face bag as shown in FIG. 4. When these two lines are extremely close to each other, completed sealing lines are fuse-bonded to each other, and air filled therein does not leak through a space. Naturally, the respective shape lines have separate power sources, though they may have a common power source. In order to increase working efficiency, the same shape lines can be used on both sides, or a totally different shape line can be combined. Further, a dotted line 13 is a lead wire for the fuse bonding wire 11, and when heat should not be generated, a low resistance wire, such as copper wire, is used.

Figure 5:
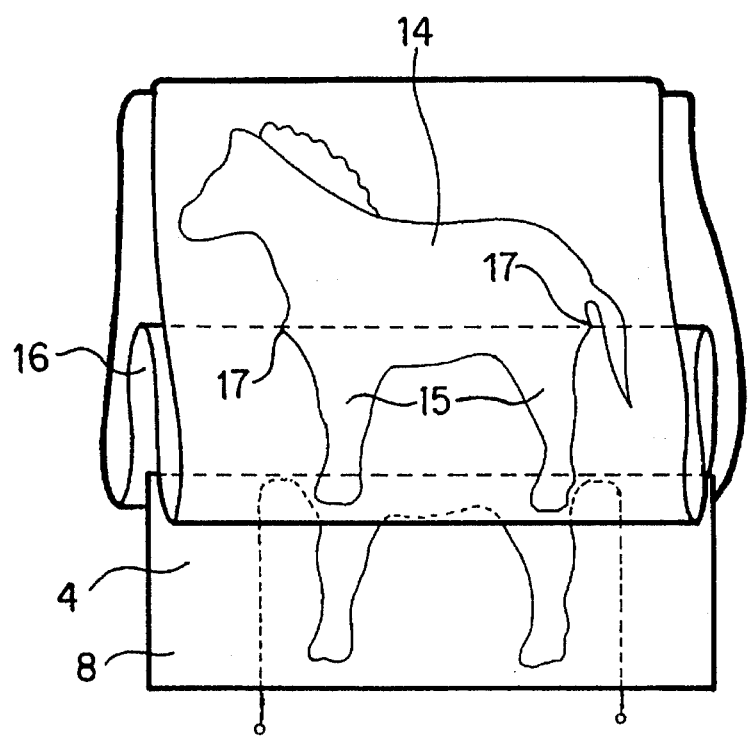
FIG. 5 is a perspective view of still another modified embodiment of the present invention.

Further, as shown in FIG. 5, in case projections, such as four legs 15, are formed in a horse balloon 14, the mold heater 4 can be separated from the pushing plates by sandwiching the mold heater 4 with fluorine resin coated glass cloths 8 provided with an adhesive agent thereon, and is placed inside the W-shape space for a gusset folding 16 of a sheet to be worked so as to heat therearound. The number of the sheets to be worked is two sheets, which is the same as the horse body of two sheets by the mold heater, so that heat can be applied equally. Further, four legs 15 on both sides can be produced without applying a parting agent to the inside of the W-shaped gusset.

This means that in case a sheet to be worked includes a plurality of gusset foldings, a plurality of heaters may be required. If a plurality of elastic plane members is provided between the pushing plates to eliminate the affect of concave and convex of the heater, a number of sheets can be inserted therebetween.

Incidentally, in case of FIG. 5 including a heat plate sealing as well as a method of the present invention, portions where the horse body 14 and the four legs 15 meet have three sealing wires to become weak. Therefore, it is desirable that as shown in the meeting portions 17 in the drawing, the sealing wires are bent to project outwardly than the other portions when the balloon is inflated. As a result, since the tensile forces applied to the meeting portions 17 from the surroundings when the balloon is inflated become weak, the meeting portions are not easily broken. Or, an air blowing mouth may be provided to this portion to slightly project outwardly.

USAGE IN THE INDUSTRIAL FIELD

A mold heater of the present invention can be manufactured very easily by bending an ordinary nichrome wire or the like with a circular cross section along a contour of an object, and sandwiching the wire with fluorine resin coated glass cloths or the like provided with an adhesive agent to thereby fix to each other.

Also, the mold heater is most suitable for manufacturing the balloons and toys, wherein a sealing width is very narrow and sealing is carried out by means of impulse heat sealing to obtain a sufficient strength.

As a processing method, an arrangement can be made freely such that a plurality of shape lines is contained in one mold heater; the mold heater can be separated from the pushing plates to heat from the inside of a gusset folding in case of forming projections to a balloon; and further a plurality of mold heaters can be provided.

Therefore, a trial production as well as mass production can be easily carried out, so that various kinds of products can be manufactured.

Energy can be saved. Since the mold heater is formed of only a thin resistance wire, the resistance wire is quickly heated and cooled to be suitable for the impulse heat sealing. The heat generated by the heater can be absorbed by the sheet to be worked and a small electric source for the heater is sufficient.

The present invention has also high productivity. In general, impulse heat sealing takes three or four times of time for one shot when compared with the heat plate sealing, but in the present invention, since two sets can be made simultaneously on the back and front sides and further two phases can be made, four pieces in total can be manufactured for one shot. The productivity is not inferior.

The production facilities of the present invention are also very economical, wherein a main press mechanism is formed with elastic plane members, such as silicone rubber or the like, provided inside the pushing plates, so that close contact can be easily attained. Accuracy is not required so much and a wide mold can also be used.

What is claimed is:

1. A method of forming a plastic bag, comprising:

preparing a plane shape heater having a resistant wire for providing heat and bent in a predetermined desired shape, and two heat resistant cloths for holding the wire therein, said resistant wire having a circular cross section and being sandwiched between said heat resistant cloths; at least one heat resisting elastic plane member situated near the heater; and a press mechanism for pressing said elastic plane member against said heater, inserting sheets to be worked between the heater and the elastic plane member, pressing the sheets between the heater and the elastic plane member by the press mechanism, and applying electric current momentarily to the resistant wire for at least fuse-bonding the sheets along the resistant wire.

2. A method as claimed in claim 1, wherein two elastic plane members are provided one on each side of the heater.

3. A method of forming a plastic bags as claimed in claim 1, wherein a plurality of said resistant wires is bent along shape lines and is arranged such that the wires project toward one direction to meet at a boundary portion of the shape lines.

4. A fuse-bonding and fuse-cutting machine, comprising, a plane shape heater having a resistant wire for providing heat and bent in a predetermined desired shape, and a heat resistant cloth for holding the wire therein, at least two heat resisting elastic plane members situated near the heater, each said heat resisting elastic plane member being located on each side of the heater, at least one of said elastic plane members having a shape similar to said shape of the resistant wire and a width slightly larger than said resistant wire so that the resistant wire can be strongly pressed; and a press mechanism for pressing said elastic plane members against said heater, two sets of sheets to be worked being inserted respectively such that one Set is located between one side of the heater and said each elastic plane member and pressed therebetween by the press mechanism so that when electric current is momentarily applied to the resistant wire, the sheets are fuse-bonded and fuse-cut along the resistant wire.

5. A fuse-bonding and fuse-cutting machine as claimed in claim 4, wherein said plane shape heater is formed of a plurality of independent heaters.

6. A fuse-bonding and fuse-cutting machine as claimed in claim 4, wherein a plurality of said resistant wires bent along a shape line is provided to said plane shape heater.

7. A fuse-bonding and fuse-cutting machine, comprising, a plane shape heater having a resistant wire for providing heat and bent in a predetermined desired shape, and two heat resistant cloths for holding and sandwiching the wire therebetween;

at least one heat resisting elastic plane member situated near the heater; and a press mechanism for pressing said elastic plane member against said heater, sheets to be worked being inserted between the heater and the elastic plane member and pressed therebetween by the press mechanism so that when electric current is momentarily applied to the resistant wire, the sheets are fuse-bonded and fuse-cut along the resistant wire.

8. A fuse-bonding and fuse-cutting machine as claimed in claim 7, wherein two heat resisting elastic plane members are formed on both sides of the plane shape heater.

* * * * *